United States Patent
Tan et al.

(10) Patent No.: US 7,218,860 B2
(45) Date of Patent: May 15, 2007

(54) OPTICAL TRANSCEIVER MODULE WITH AMBIENT LIGHT CIRCUITRY

(75) Inventors: Wee Sin Tan, Singapore (SG); Sanjay Krishnan, Eastern Lagoon (SG); Ramana-V Pamidighantam, Singapore (SG)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 607 days.

(21) Appl. No.: 09/948,252

(22) Filed: Sep. 4, 2001

(65) Prior Publication Data

US 2002/0048068 A1 Apr. 25, 2002

(30) Foreign Application Priority Data

Sep. 8, 2000 (SG) ............... 200004630-0

(51) Int. Cl.
H04B 10/00 (2006.01)
G01J 1/44 (2006.01)
H05B 37/02 (2006.01)
H05B 39/04 (2006.01)

(52) U.S. Cl. ............... 398/128; 398/135; 398/162; 250/214 AL (58) Field of Classification Search ............... 398/202, 398/203, 204, 25, 128, 130, 135, 151, 162; 250/214 AL, 214 B
See application file for complete search history.

(56) References Cited

U.S. PATENT DOCUMENTS

| | | | |
|---|---|---|---|
| 4,821,338 A | 4/1989 | Naruse et al. | |
| 4,939,482 A | 7/1990 | Nergaard et al. | |
| 5,027,433 A | 6/1991 | Menadier et al. | |
| 5,528,407 A | 6/1996 | Nakata et al. | |
| 5,545,891 A * | 8/1996 | Smith | 250/214 AL |
| 5,684,294 A * | 11/1997 | Kouhi | 250/214 AL |
| 5,763,900 A | 6/1998 | Wang | |
| 5,861,968 A | 1/1999 | Kerklaan et al. | |
| 5,877,745 A | 3/1999 | Beeteson et al. | |

FOREIGN PATENT DOCUMENTS

| | | |
|---|---|---|
| DE | 44 46 328 A1 | 8/1995 |
| DE | 197 17 926 A1 | 12/1998 |
| EP | 0587371 A1 | 3/1994 |
| EP | 0 530 212 B1 | 3/1995 |
| EP | 0 682 448 | 11/1995 |
| JP | 05159345 A | 6/1993 |
| JP | 07235906 A | 9/1995 |
| JP | 09181676 A | 7/1997 |
| JP | 11055188 A | 2/1999 |

OTHER PUBLICATIONS

"IrDA Data 1.2 Low Power Compliant 115.2 kb/s Infrared Transceiver", Hewlett Packard, 1998, http:// http://openarm.linuxforum.net/doc/Datasheet/HSDL3201.PDF.*
"Agilent HSDL-3201 IrDA Data 1.4 Low Power Compliant 115.2 kb/s Infrared Transceiver" data sheet; 20 pages.

* cited by examiner

Primary Examiner—Jason Chan
Assistant Examiner—Nathan Curs (57) ABSTRACT

An optical transceiver module which includes circuitry for detecting ambient light conditions in addition to circuitry for processing received optical data.

18 Claims, 7 Drawing Sheets

OPTICAL TRANSCEIVER MODULE WITH AMBIENT LIGHT CIRCUITRY

This invention relates generally to an optical transceiver module. In particular, the invention relates to an optical transceiver module comprising ambient light circuitry.

BACKGROUND OF THE INVENTION

Infrared transceivers modules are often incorporated into electronic devices to enable bi-directional wireless communication with other electronic devices. For example, it is known for a portable digital assistant (PDA) to communicate with a laptop computer, a printer, or another PDA via a standard Infrared Data Association (IrDA) link. Similarly, IR transceivers are becoming increasingly popular for use in hand-portable telephones, enabling telephone users to swap stored numbers, play wirelessly-linked games, or wirelessly link their telephones to IR-enabled accessories. Other devices which have IR transceivers include, for example, pagers, digital cameras, printers and personal computers.

The advantages of using an IR link over standard electrical connectors are numerous and well documented. These advantages include: 1) greater alignment tolerance; 2) the ability to hermetically seal the data interface; 3) no cables susceptible to RF interference; and 4) no electromagnetic compatibility (EMC) issues.

An IR transceiver module typically comprises a light emitting diode (LED) and a photodiode, packaged together with appropriate supporting circuitry to form a self-contained unit. Electrical terminals are exposed on the outside of the package to enable the module to be electrically coupled to external circuitry.

By combining the various components of an IR transceiver into a single package or module, the size or form-factor of the transceiver system can be considerably reduced. Furthermore, the modules tend to be more durable and often consume less power than equivalent transceivers consisting of discrete components.

Figure 1:
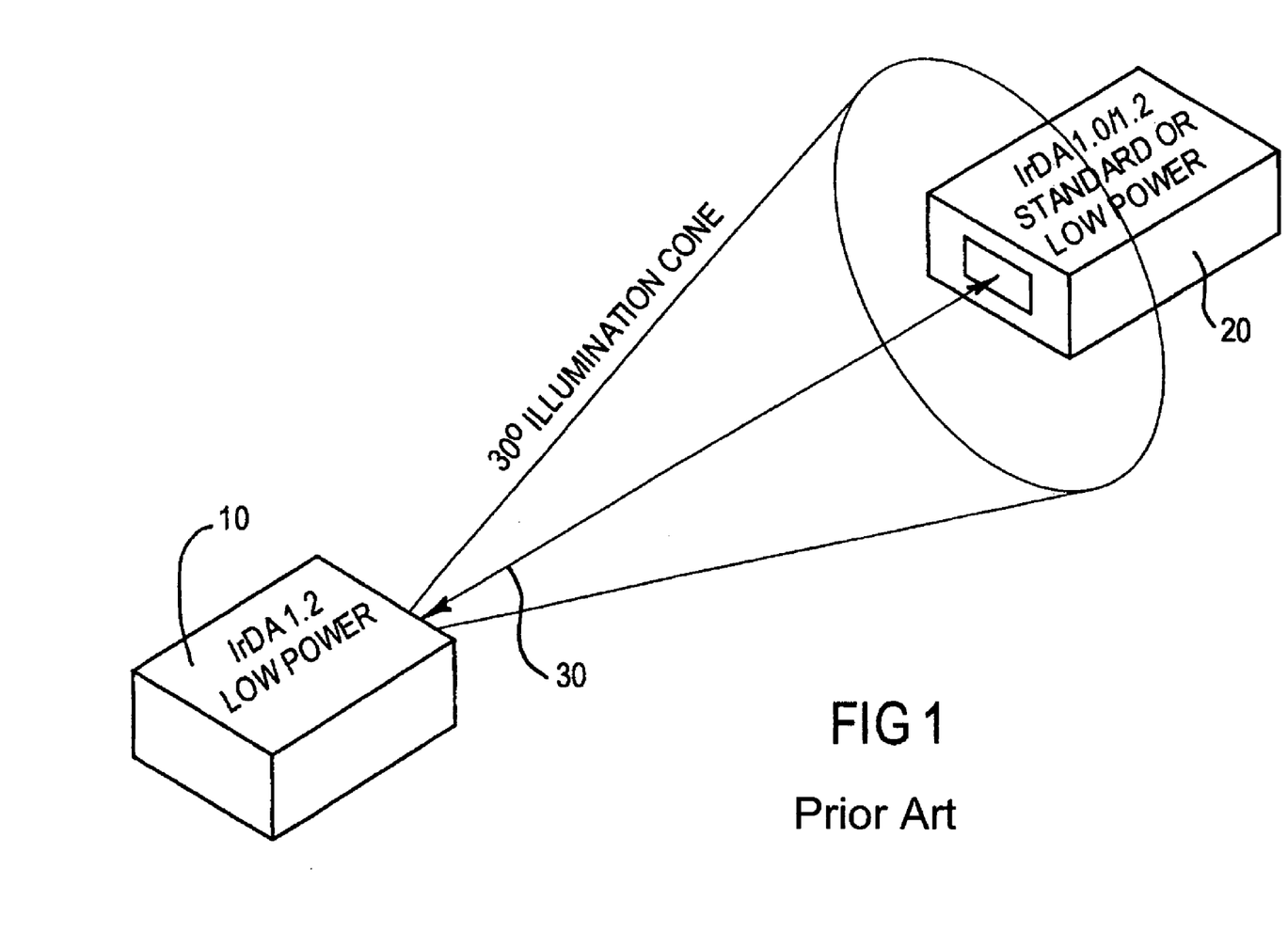
FIG. 1 illustrates schematically two spaced-apart devices communicating via an IR link.

When an IR link or communication channel is created between two IR transceiver modules, the LED in the first transceiver optically couples with the photodiode in the second transceiver, and the LED in the second transceiver optically couples with the photodiode in the first transceiver. FIG. 1 illustrates two spaced apart devices 10, 20 which are communicating via such an IR link 30. Although the transceivers typically operate in the infrared optical frequency band it is equally possible for other optical frequency bands to be used in forming the communication channel 30.

Figure 2:
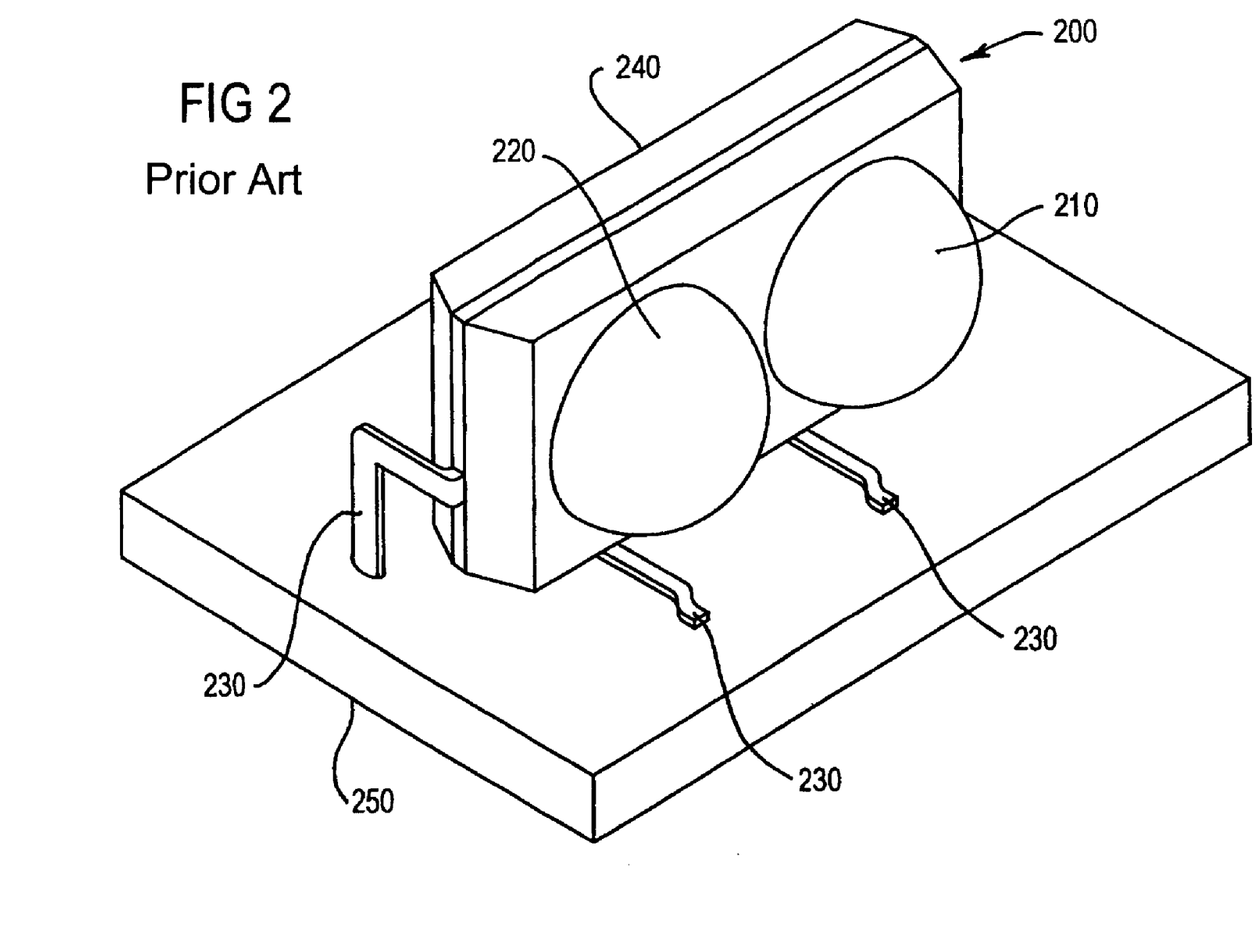
FIG. 2 is an internal view of the device of FIG. 1 showing an IR transceiver mounted on a circuit board.

FIG. 2 is an internal view of the device 10 of FIG. 1, showing the IR transceiver module 200 mounted on an end portion of a main printed circuit board (PCB) 250. The transceiver module 200 comprises a main body 240 including a first molded lens shape 210 over the LED and a second molded lens shape 220 over the photodiode. Leads 230 provide mounting supports and electrical interconnections between the IR transceiver 200 and the printed circuit board 250. A typical length for the IR transceiver body is approximately 10 mm, a typical depth is 5 mm, and a typical height is 4 mm.

It is known to include an ambient light detector in certain electronic devices to detect the ambient light conditions in the environment of the device. For example, the model CB-21Q20ET television available from LG Electronics, Korea includes a light detector which detects ambient light conditions so that the television picture contrast can be set appropriately.

SUMMARY OF THE INVENTION

The present invention provides an optical transceiver module which includes circuitry for detecting ambient light conditions in addition to circuitry for processing received optical data.

According to the present invention, there is provided an optical transceiver module comprising a transmitter device for transforming electrical signals into optical signals, a receiver device for transforming optical signals into electrical signals, receiver circuitry for processing electrical signals from the receiver device to produce a receiver data output, and ambient light circuitry for processing electrical signals from the receiver device to produce an ambient light output.

An optical transceiver module in accordance with the invention has the advantage of being able to transmit and receive data over an optical communications channel as well as being able to detect the ambient light conditions experienced by the module.

When the optical transceiver module is employed in an electronic device, the ambient light output signal may used for a variety of applications. One possible application of the ambient light signal is to provide light level information directly to a user of the electronic device. Such information is useful to photographers working with film cameras. The ambient light signal could also be used in the device to automatically trigger a particular function, such as back-lighting. The ambient light signal could also automatically adjust settings in the device, such as the exposure level in a digital camera.

Preferably, receiver circuitry and the ambient light circuitry are formed on a single integrated circuit.

Suitably, the module includes transmitter circuitry for supplying a modulated electrical signal to the transmitter device.

The module may include a supply voltage input line for supplying a voltage to the receiver circuitry and the receiver device. The ambient light circuitry may then be coupled to the supply voltage input line to detect a current thereon. Preferably, the ambient light circuitry is coupled to the receiver device to detect a current through the receiver device.

Ideally, the ambient light circuitry detects a substantially DC component of the electrical signals from the receiver device, and the ambient light circuitry detects a substantially AC component of the electrical signals from the receiver device.

Preferably, the transmitter device is a light emitting diode, and the receiver device is a photodiode.

Figure 3:
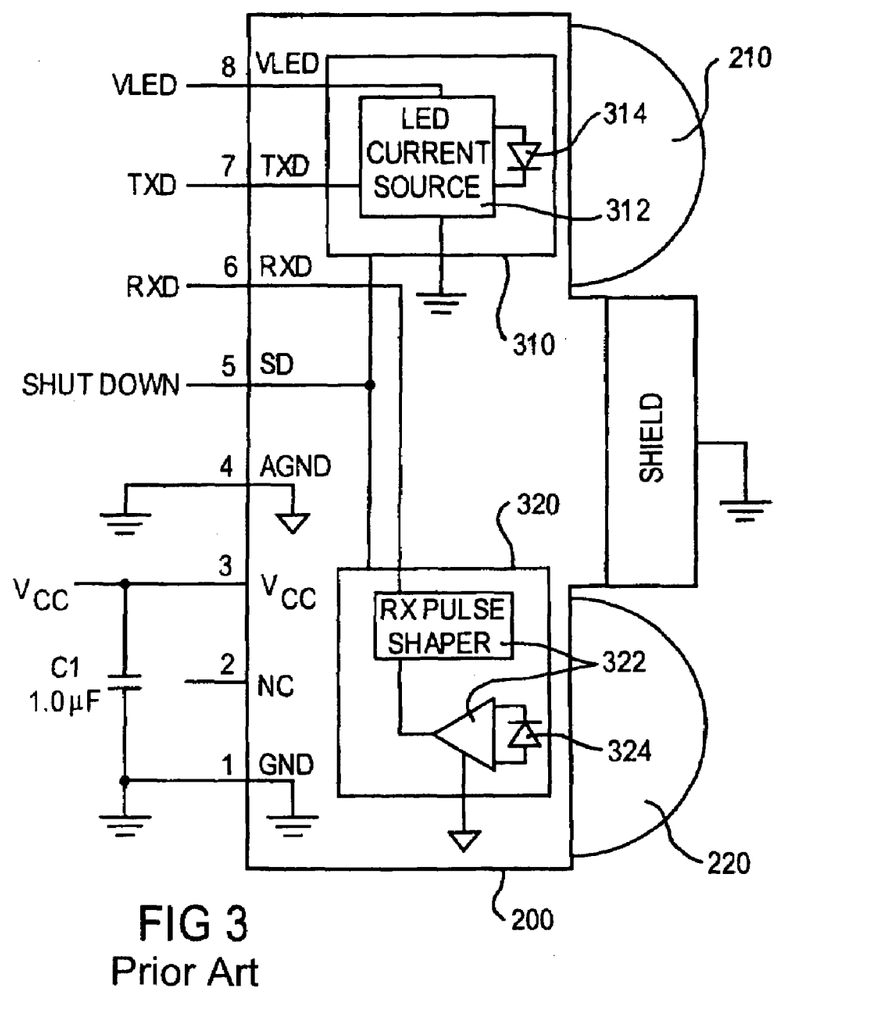
FIG. 3 is a block diagram of a known IR transceiver module.

Embodiments of the invention will now be described, by way of example, with reference to the accompanying drawings, in which:

FIG. 3 is a block diagram showing the basic functions of a known IR transceiver module 200 such as the HSDL-3201 model infrared transceiver available from Agilent Technologies Inc., USA. Detailed specifications of the HSDL-3201 transceiver may be found in the technical data sheet published by Agilent Technologies, entitled "IrDA(TM) Data 1.2 Low Power Compliant 115.2 kb/s Infrared Transceiver".

IR transceiver module 200 is an encapsulated unit comprising a transmitter 310, a receiver 320, and eight terminal pins 1, 2, 3, 4, 5, 6, 7, and 8.

Figure 4:
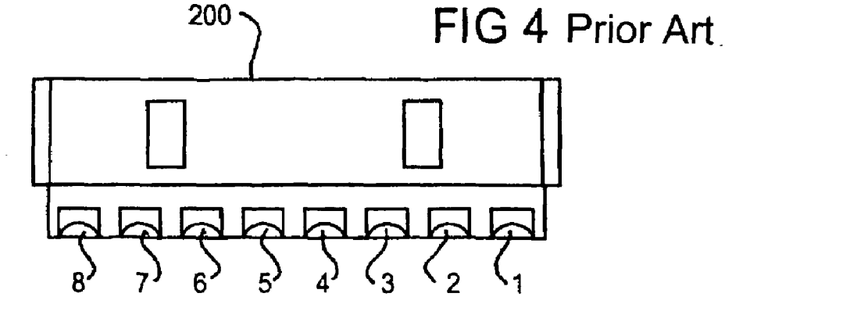
FIG. 4 is a rear view of the IR transceiver module of FIG. 3.

The terminal pins 1, 2, 3, 4, 5, 6, 7, and 8 may be provided by leads 230 as shown in FIG. 2, or by metallic plated areas on the outer surface of the optical transceiver module 200 as shown in FIG. 4. Providing the terminal pins as metallic plated areas enables the IR transceiver module 200 to be surface mounted onto a circuit board and electrically coupled to external circuitry. The following table summarises the configuration of each terminal pin 1, 2, 3, 4, 5, 6, 7, and 8 when coupling the IR transceiver module to external circuitry:

| Pin | Symbol | Description | Notes |
| --- | --- | --- | --- |
| 1 | GND | Ground | Connect to system ground. |
| 2 | NC | No Connection | This pin should be left unconnected. |
| 3 | Vcc | Supply Voltage | Regulated: 2.7 to 3.6 volts |
| 4 | AGND | Analog Ground | Connect to a "quiet" ground. |
| 5 | SD | Shut Down Active High | This pin must be driven either high or low. Do NOT float the pin. |
| 6 | RXD | Receiver Data Output. Active Low | Output is a low pulse for 2.4 µs when a light pulse is seen. |
| 7 | TXD | Transmitter Data Input. Active High | Logic high turns the LED on. TXD must be driven high or low. Do NOT float the pin. |
| 8 | VLED | LED Voltage | May be unregulated: 2.7 to 6.0 volts |

It is advisable to filter stray signals on the Vcc supply voltage using an external 1.0 micro Farad capacitor C1 connected in parallel with the Vcc terminal pin 3.

The transmitter 310 comprises transmitter circuitry 312 coupled to the TXD pin 7 and the VLED pin 8, and a transmitter device 314 for converting electrical signals received from the transmitter circuitry 312 into light signals in the infrared region of the electromagnetic spectrum. In the present embodiment, the transmitter device 314 is a standard light emitting diode (LED) emitting light at a peak wavelength of 875 nanometers. The transmitter circuitry 312 operates, in response to a square-wave signal taken from the Transmitter Data Input (TXD) pin 7, to supply a corresponding modulated electrical signal to the LED 312. The LED 312 in turn generates light pulses in accordance with the modulated electrical signal. Consequently, the transmitter 310 generates a light signal modulated by the TXD signal. The VLED pin 8 provides the necessary current to drive the LED 314.

The receiver 320 comprises receiver circuitry 322 coupled to the RXD pin 6, and a receiver device 324 for converting light signals received through the lens 220 of the transceiver module 200 in the infrared region of the electromagnetic spectrum into electrical signals. In the present embodiment, the receiver device 324 is a photodiode such as a reverse-biased PIN (P-type, Intrinsic, N-type) diode having a peak sensitivity wavelength of 880 nanometers. The receiver circuitry 322 operates to process electrical signals received from the PIN diode 324 and output a TTL level square-wave modulated data signal to the RXD pin 6. Consequently, the receiver 320 generates a receiver data output on the RXD pin 6 in response to light signals detected by the transceiver.

According to the schematic diagram of FIG. 3, the transmitter circuitry 312 and the receiver circuitry 322 are shown situated at opposite ends of the transceiver module 200. In practice, the transmitter and receiver circuitry 312, 322 are formed on a single BiCMOS integrated circuit (IC). A supply voltage Vcc pin 3 provides a regulated 3 volt voltage supply for driving the transmitter and receiver circuitry 312, 322 on the IC, as well as the PIN diode 324.

FIG. 3 illustrates a Shut Down pin 5 coupled to the transmitter 310 and the receiver 320. By raising the voltage on the Shut Down pin 5 from zero volts to 3 volts, the transceiver module can be completely shut down to achieve very low power consumption. In the shut down mode, the transmitter and receiver circuitry 312, 322 on the IC are almost inactive and thus produce very little current even under very active light conditions.

Figure 5:
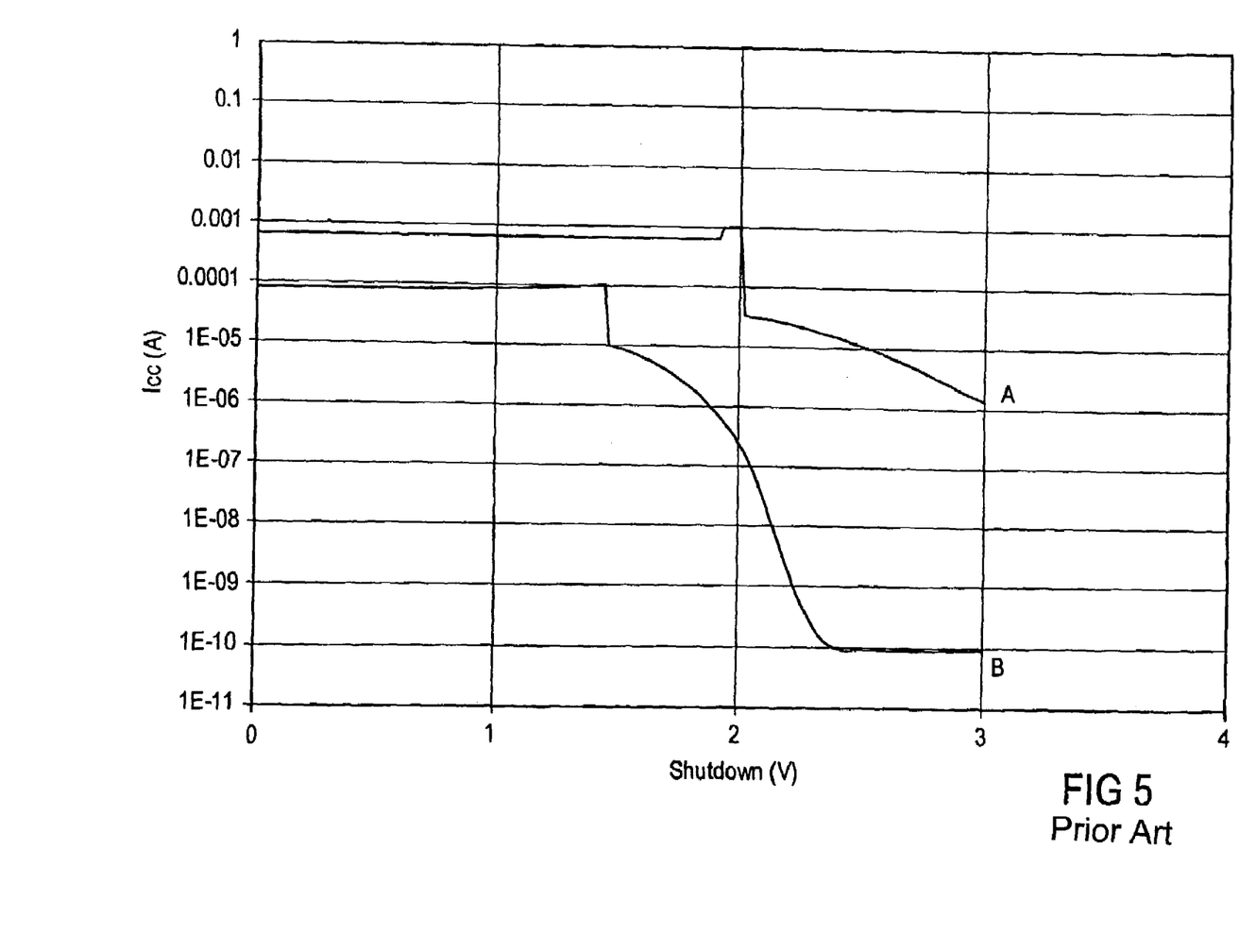
FIG. 5 is a graph illustrating the leakage current on the supply voltage Vcc versus the Shut Down voltage at two different ambient light levels.

The current drain Icc on the Vcc supply is proportional to the activity of the receiver 320. For example, during periods when light signals are received by the transceiver module and processed to produce a receiver data output on RXD, there will be a greater current Icc drawn on the Vcc supply. FIG. 5 illustrates as a function of the Shutdown voltage the level of current Icc drawn from the Vcc pin 3 when the receiver is idle. The top line A shows the level of Icc when there is ambient light shining on the receiver lens 220 of the transceiver module 200. The bottom line B shows the level of Icc when there is no ambient light shining on the receiver lens 220. The difference between the top line A and the bottom line B is attributable to the leakage current through the PIN diode 324 which is proportional to the ambient light incident thereon.

The ambient light dependent signal produced by the PIN diode interferes with detection of received light signals in the receiver circuitry 322. Accordingly, the receiver circuitry 322 is designed to filter out any differences in the leakage current of the PIN diode in different lighting conditions.

Figure 6:
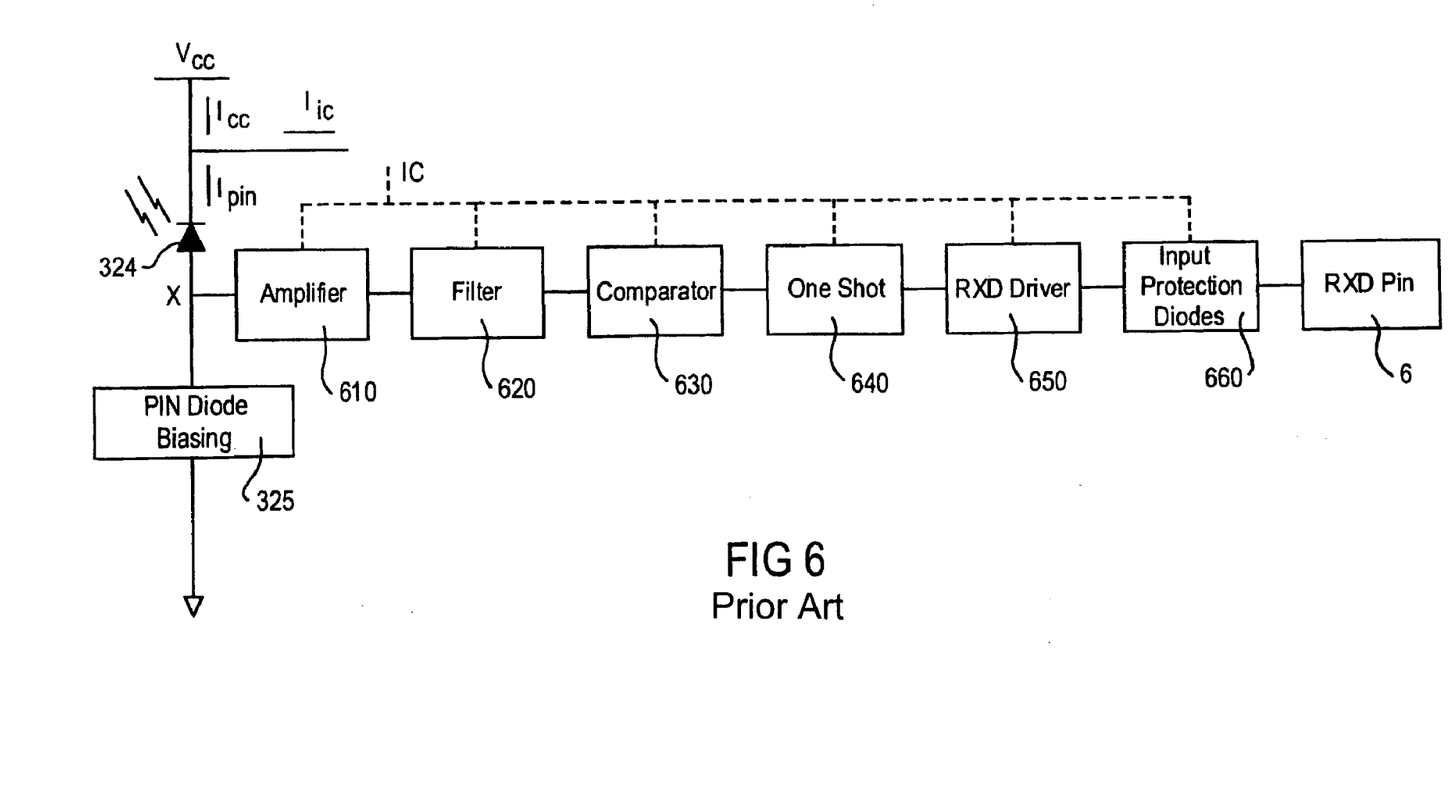
FIG. 6 is a block diagram of the receiver of the IR transceiver module of FIG. 3.

The receiver 320 will now be described in more detail with reference to FIG. 6. The PIN diode 324 is reverse biased, as shown in FIG. 6, by coupling the cathode to the supply voltage Vcc, and the anode via a biasing resistor 325 to ground. The current Ipin flowing through the PIN diode 324 is proportional to the intensity of light incident on the diode. This current Ipin is detected in the receiver by tapping the voltage at the junction X between the PIN diode 324 and the biasing resistor 325. The total current Icc drawn from the Vcc pin is the sum of the current Ipin and the current Iic drawn by the integrated circuit (IC).

The receiver circuitry 322 is contained on the integrated circuit (IC) and comprises in series; an amplifier 610, a filter 620, a comparator 630, a one shot 640, a RXD driver 650, and input protection diodes 660. The signals output from each stage of the receiver circuitry are input to the next stage in the series, except for the input protection diodes 660 which output the final receiver data signal to the RXD pin 6.

The amplifier 610 receives the voltage tapped from the junction X and operates to output an amplified voltage signal to the filter 620. In order to accurately measure the current Ipin and not influence the current Ipin, the amplifier 610 is implemented as an operational amplifier with a high input impedance.

The filter 620 bandwidth limits the amplified voltage signal to reject signals outside the expected frequency band. The expected frequency band for IrDA compliant signals has values ranging from around 115.2 Kbits/second to around 4 Mbits/second.

The band-width limited signals output from the filter resemble analogue-like signals even though the signals are actually streams of digital data. Therefore, the pulses require shaping before they are output from the transceiver. The comparator 630 operates on the filtered signal to shape the analogue-like signal pulses into square-wave signal pulses. These variable-width square-wave pulses are then operated on by the one shot 640. The one shot 640 is a mono-stable multivibrator which standardises the width of the square-wave pulses so that they are suitable for subsequent digital processing.

Input protection diodes 660 prevent any raised voltages on the RXD pin 6 from damaging the receiver circuitry. The shaped square-wave pulsed signal is finally output on the RXD pin 6.

Figure 7:
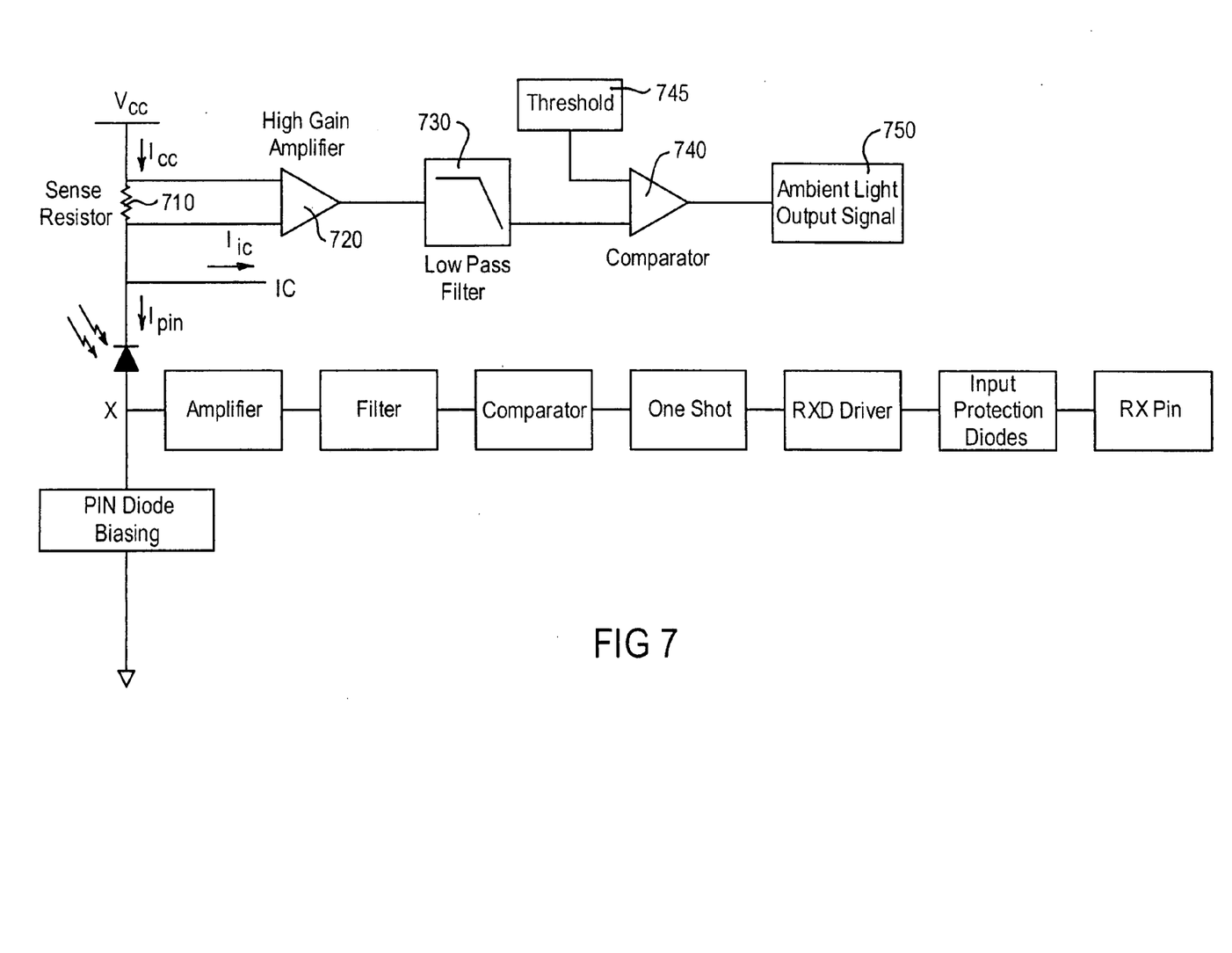
FIG. 7 is a block diagram of a receiver of an IR transceiver module including ambient light circuitry according to a first embodiment of the invention.

Referring to FIG. 7 there is shown a block diagram of the receiver 320 of FIG. 6 modified to include ambient light circuitry 710, 720, 730, 740, 745, and 750 in accordance with the invention. The ambient light circuitry is designed to detect the DC component of the current Ipin passing through the PIN diode. Unlike the AC-coupled component of the current Ipin which is representative of modulated data received by the PIN diode 324, the DC component of the current Ipin gives an indication of the ambient light incident on the PIN diode 324 which is generally unmodulated. Therefore, by separately detecting the DC component of the current Ipin an ambient light signal can be obtained.

The ambient light circuitry may be provided by discrete circuitry and includes a 10 ohm sense resistor 710 placed in series with the input voltage supply Vcc. The voltage drop over the sense resistor 710 is directly proportional to the current Icc. Assuming that the current Iic drawn by the IC remains constant, any difference in the DC component of the current Ipin caused by changes in ambient light conditions generates a corresponding change in the current Icc sensed by the sense resistor 710. A constant value of Iic can occur when the receiver circuitry is idle but occurs most reliably when the IC is shut down by the 3 volt Shut Down voltage (see FIG. 5).

As shown in FIG. 5, the current Icc which is drawn during shut down of the transceiver ranges from 0.1 to 1500 nano-Amperes depending on the ambient light conditions. The voltage across the sense resistor will therefore range from about 1 nanoVolts to 15 microVolts. To detect this very low voltage, a high gain amplifier 720 is coupled in parallel with the sense resistor 710. A low pass filter 730 receives the amplified sense voltage and removes the high frequency component produced by data signals received by the PIN diode or by noise. The ambient light circuitry optionally includes a comparator which produces either a low (e.g. zero volt) or high (e.g. 3 volt) output depending on whether the filtered sense voltage exceeds a threshold voltage 745. The threshold voltage 745 can be set empirically to give a required binary detection of ambient light or no ambient light. The ambient light output signal 750 is provided to a terminal pin of the transceiver such as the spare NC pin 2 (see FIG. 3).

Instead of being provided by discrete circuitry, the ambient light circuitry of FIG. 7 may be formed on the integrated circuit (IC), provided that the portion of the IC forming the ambient light circuitry is designed to remain active when the Shut Down voltage is applied. Furthermore, the ambient light circuitry must also draw substantially constant current from the IC for different Ipin currents so that the constant Iic current condition is maintained.

Figure 8:
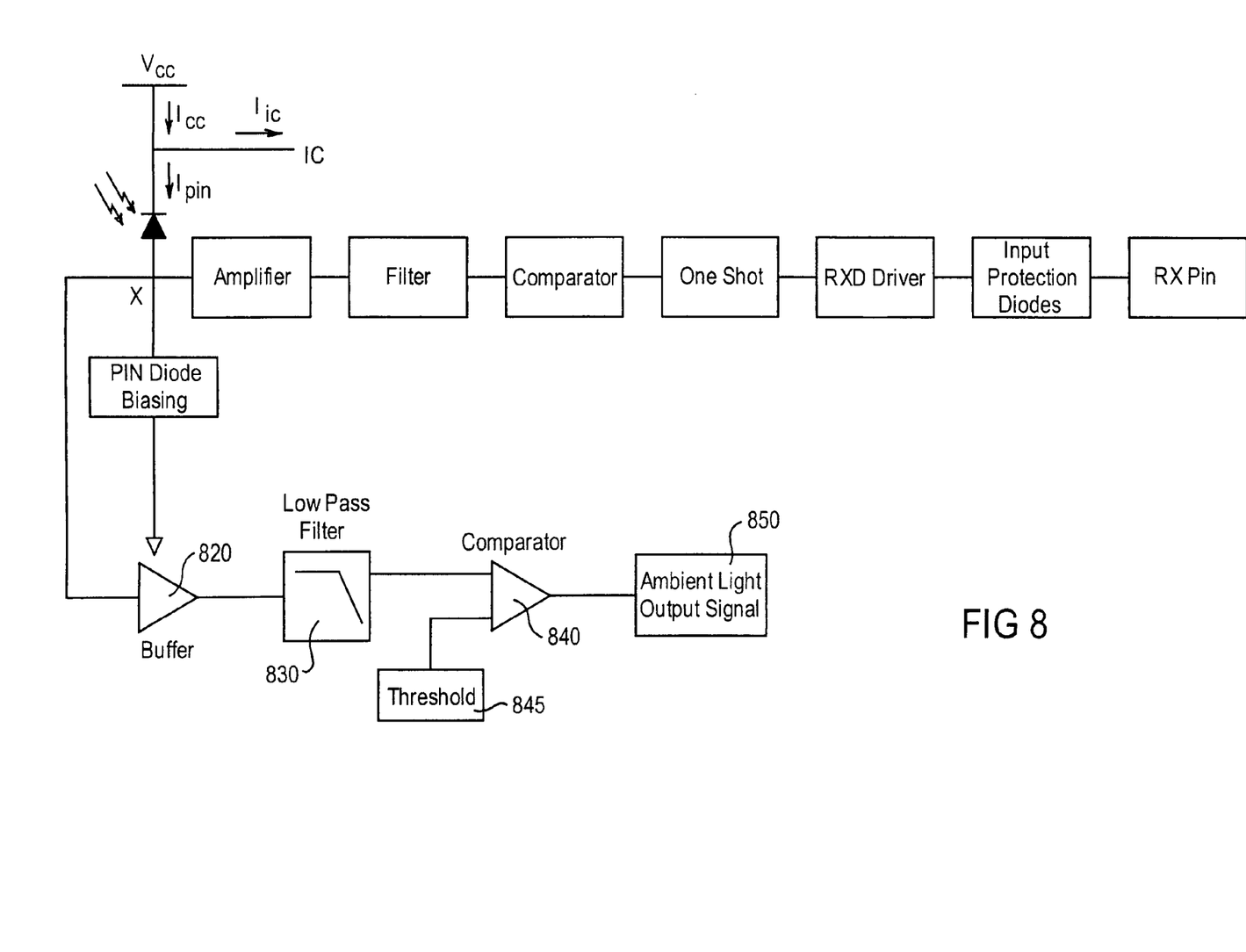
FIG. 8 is a block diagram of a receiver of an IR transceiver module including ambient light circuitry according to a second embodiment of the invention.

An alternative embodiment of the ambient light circuitry is shown in FIG. 8. In this embodiment, the voltage over the PIN diode biasing is tapped as in the receiver circuitry. The ambient light circuitry operates to detect the DC component of the Ipin current in contrast to the circuit of FIG. 7 which detects the Icc current and assumes the Iic current to be constant.

Buffer 820 provides a high impedance input for the ambient light circuitry so that the circuitry draws negligible current. The voltage signal received by the buffer is output to the filter 830 which filters out the high frequency components of the signal leaving the substantially DC components. The filtered signal is processed by the comparator 840 in the same manner as the ambient light circuitry of FIG. 7 to provide an ambient light signal output 850 to the NC pin 2.

It will be evident in view of the foregoing that various modifications may be made within the scope of the present invention.

The invention claimed is:

1. An optical transceiver module comprising:
    a transmitter device for transforming electrical signals into optical signals,
    a receiver device for transforming optical signals into electrical signals,
    receiver circuitry for processing the electrical signals from the receiver device to produce a receiver data output, and
    ambient light circuitry for processing the electrical signals from the receiver device, wherein the ambient light circuitry has a supply current consumption that is independent of the electrical signals from the receiver device, and wherein the supply current consumption of the ambient light circuitry is made independent of the electrical signals from the receiver by using a high-gain amplifier in the ambient light circuitry that measures a voltage across at least one sense resistor that is in series with a supply voltage input line of the module that supplies a supply voltage to the module, and wherein the ambient light circuitry produces an ambient light output that is based on the measured voltage across said at least one sense resistor, and wherein the ambient light circuitry, transmitter device, receiver device and receiver circuitry are packaged together in the module.

2. An optical transceiver module as claimed in claim 1, wherein the receiver circuitry and the ambient light circuitry are formed on a single integrated circuit.

3. An optical transceiver module as claimed in claim 1 or claim 2, wherein the module includes transmitter circuitry for supplying a modulated electrical signal to the transmitter device.

4. The optical transceiver module as claimed in any one of claims 1 or 2, wherein the ambient light circuitry detects, via the connection of the high-gain amplifier across said at least one resistor, a substantially DC component of the electrical signals from the receiver device.

5. An optical transceiver module as claimed in any one of claims 1 or 2, wherein the transmitter device is a light emitting diode.

6. An optical transceiver module as claimed in any one of claims 1 or 2, wherein the receiver device is a photodiode.

7. An optical transceiver module as claimed in claim 1 wherein the ambient light circuitry includes a low pass filter disposed between the receiver device and the ambient light output.

8. An optical transceiver module as claimed in claim 7 wherein the ambient light circuitry further includes a comparator disposed between the low pass filter and the ambient light output, the comparator comparing an output of the low pass filter to a threshold.

9. An optical transceiver module as claimed in claim 1 wherein the ambient light circuitry draws substantially constant current.

10. An optical transceiver module as claimed in claim 8 wherein the low-pass filter is disposed between an output of the high-gain amplifier and an input of the comparator.

11. An optical transceiver module as claimed in claim 1 wherein the receiver device transforms optical signals transmitted by a second optical transmitting device.

12. An optical transceiver module as claimed in claim 1 wherein the optical transceiver module receives and transmits signals in a frequency range of from about 115 kilobits per second to about 4 Megabits per second.

13. An optical transceiver module comprising:
    a transmitter device for transforming electrical signals into optical signals,
    a receiver device for transforming optical signals into electrical signals,
    receiver circuitry for processing the electrical signals from the receiver device to produce a receiver data output, and
    ambient light circuitry for processing the electrical signals from the receiver device to produce an ambient light output, wherein the ambient light circuitry has a supply current consumption that is independent of the electrical signals of the receiver device, the supply current consumption being made independent of the electrical signals of the receiver device through use of a buffer device having an high-impedance input coupled to the receiver device, the high-impedance input of the buffer device ensuring that the ambient light circuitry draws negligible current, and wherein the ambient light circuitry, transmitter device, receiver device and receiver circuitry are packaged together in the module.

14. An optical transceiver module as claimed in claim 13, wherein the receiver circuitry and the ambient light circuitry are formed on a single integrated circuit.

15. An optical transceiver module as claimed in claim 13, wherein the transmitter device is a light emitting diode.

16. An optical transceiver module as claimed in claim 13, wherein the receiver device is a photodiode.

17. An optical transceiver module as claimed in claim 13, wherein the ambient light circuitry includes a low pass filter disposed between the receiver device and the ambient light output.

18. An optical transceiver module as claimed in claim 17, wherein the ambient light circuitry further includes a comparator disposed between the low pass filter and the ambient light output, the comparator comparing an output of the low pass filter to a threshold.

* * * * *